United States Patent

Shin et al.

[11] Patent Number: 5,184,722
[45] Date of Patent: Feb. 9, 1993

[54] KEEPING CASE FOR THE CASSETTE TAPE AND OTHERS

[76] Inventors: Han-Jin Shin, 93-23, Jungkog-Dong, Seongdong-Gu, Seoul; Joong-Ki Kim, 264-12 Imun 2-Dong, Tongdaemun-Gu, Seoul, both of Rep. of Korea

[21] Appl. No.: 764,709

[22] Filed: Sep. 24, 1991

[51] Int. Cl.⁵ .......................................... B65D 85/672
[52] U.S. Cl. .................................... 206/387; 206/504; 220/23.4
[58] Field of Search ...................... 206/387, 504, 23.4

[56] References Cited

U.S. PATENT DOCUMENTS

| | | | |
|---|---|---|---|
| 3,977,752 | 8/1976 | Cousino | 220/23.4 |
| 4,055,372 | 10/1977 | Tozawa et al. | 206/387 X |
| 4,131,197 | 12/1978 | Blankenmeister et al. | 206/387 |
| 4,196,806 | 4/1980 | Posso | 206/387 |
| 4,512,469 | 4/1985 | West | 220/23.4 |

FOREIGN PATENT DOCUMENTS

| | | | |
|---|---|---|---|
| 2719783 | 11/1977 | Fed. Rep. of Germany | 206/387 |
| 3003260 | 8/1981 | Fed. Rep. of Germany | 206/387 |
| 050363 | 3/1982 | Japan | 206/387 |
| 2148256 | 5/1985 | United Kingdom | 206/387 |

*Primary Examiner*—William I. Price
*Attorney, Agent, or Firm*—Anthony J. Casella; Gerald E. Hespos

[57] ABSTRACT

A keeping case for a cassette is provided. The keeping case includes an inner case pivotally connected to an outer case by a point hinge. Connecting bodies are provided for connecting one such keeping case to another keeping case adjacent thereto. The connected keeping cases are able to stand freely and to enable access to cassettes stored therein.

2 Claims, 10 Drawing Sheets

KEEPING CASE FOR THE CASSETTE TAPE AND OTHERS

BACKGROUND OF THE INVENTION

This invention relates to a keeping case for a compact disc, cassette tape, video tape, etc., (hereinafter called cassette). More particularly, this keeping case is able to be opened by a one point hinge, and able to connect to other such cases, thereby the connected cases can be utilized, as a stand for the keeping cases.

For example, up to now, a keeping case for compact disc is formed such that the compact disc is inserted in the case, covered with the outside cover, and kept separately. The prior keeping case for a cassette has a transversing shaft, and thereby opens horizontally. Therefore, when the cassette is withdrawn from the keeping case, the cover should be opened and then, the cassette tape is withdrawn horizontally. Conversely, when the cassette is inserted in the keeping case, the cassette should be horizontally aligned to the opening of the case, and then inserted into the case. Finally, the outer case is covered. Therefore, in use, it is very inconvenient.

The prior keeping case for a video tape is formed such that the front and the back cover of the case have wide width. The front cover is utilized as a lid for opening and closing the keeping case. In use, the front cover should be opened, with the video tape located at the projected portion of the back cover opposed to the front cover to prevent the movement in the case. Finally the front cover is closed.

In the prior art keeping case of a video tape, when the video tape is inserted in the keeping case, the video tape should be exactly located at the predetermined position, so that the front cover can be closed.

Therefore, it is very inconvenient in using.

SUMMARY OF THE INVENTION

This invention is a keeping case for a cassette which solves the above problems.

In accordance with the present invention, a keeping case is opened by one point hinge mechanism, and a plurality of keeping cases can be connected with each other. Thus it is possible to connect the keeping cases continuously, and the connected body of cases can be utilized as a stand for the cassettes.

In accordance with the present invention, a cassette is inserted in, or withdrawn from the keeping case by the one point hinge mechanism, so that it is very convenient in using. Each keeping case can be continuously connected with others in disregard of their quantity.

There is no concern about missing the keeping case of the cassette and there is no need to prepare a stand for the keeping cases separately, because the connected keeping cases maintain their fixed position.

Consequently, the cassette can be withdrawn only from the connected body and replaced to that body again, so that there is no concern about inserting a cassette in the undesired keeping case, after using.

When the keeping cases are located on a desk, the connected body of cases is utilized as a stand. Accordingly, the occupation area of the body is smaller than the prior stand which has a predetermined shape.

The keeping cases are variably connected in accordance with the quantity of the cassette tapes and the like.

Embodiments of this convention will be now described by way of example only with reference to the accompanying drawings in which.

DESCRIPTION OF THE PREFERRED EMBODIMENTS

Figure 1:
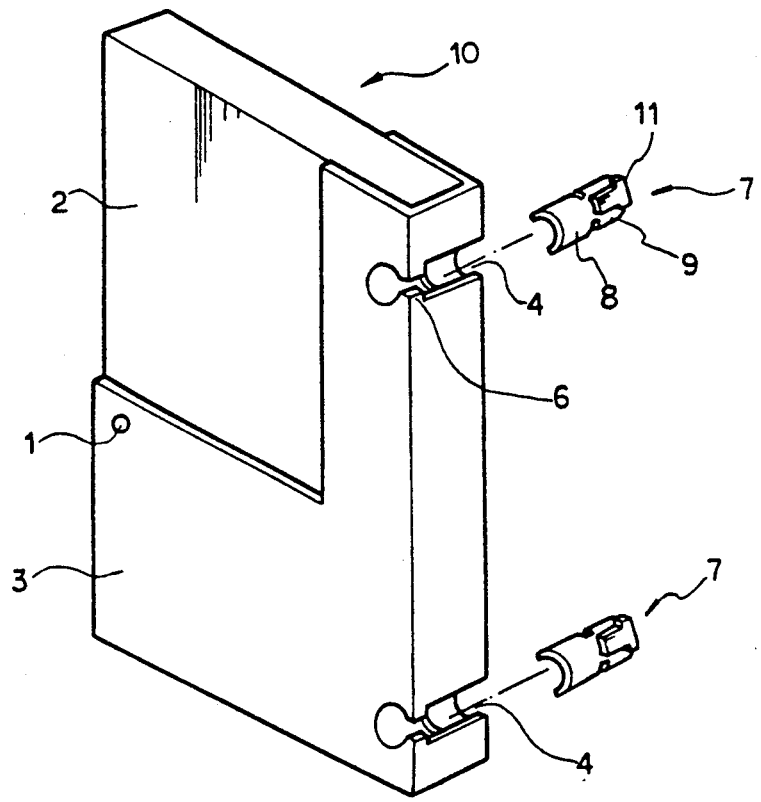
FIG. 1 is an exploded perspective view of a cassette keeping case of this invention.
Figure 2:
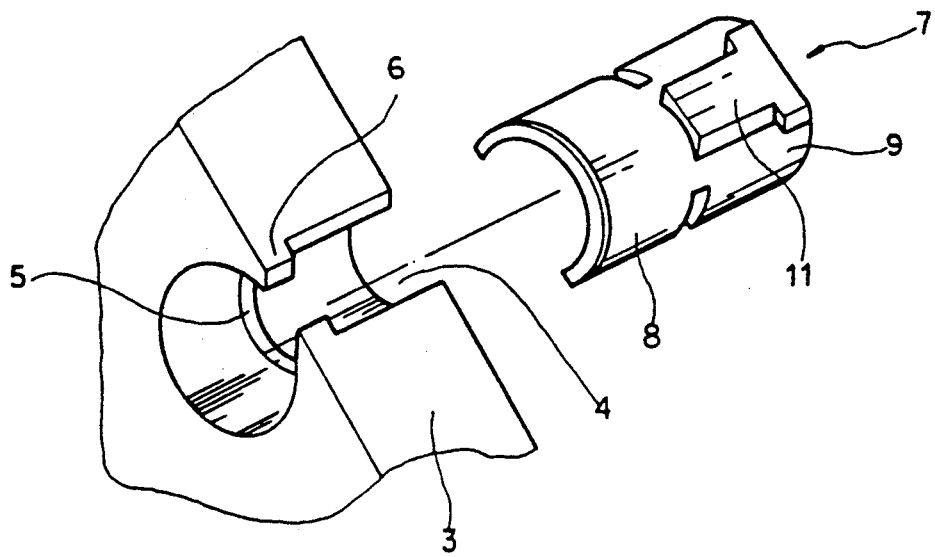
FIG. 2 is a detailed exploded perspective view of the connection part.
Figure 3:
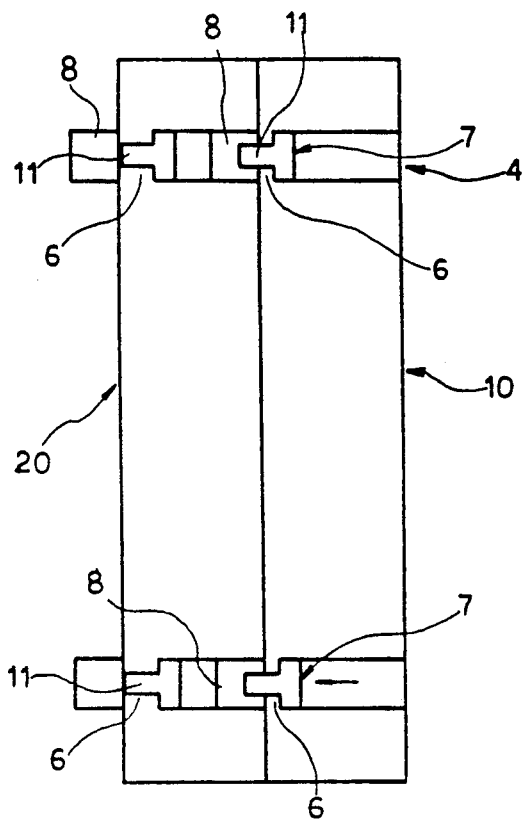
FIG. 3 is a back elevational view of the connected keeping cases in accordance with the present invention.

In an embodiment of the cassette tape keeping case shown in FIG. 1 to FIG. 3, a cassette tape keeping case 10 of this invention is pivotally divided into an inner case 2 and a outer case 3 at the pivot 1.

If the upper part of the inner case 2 is withdrawn, the cassette keeping case in pivotally opened around the pivot 1. The pivot 1 passes through the inner case 2 and the outer case 3.

The inner case 2 is inserted into the outer case 3. Consequently, before the cassette tape (not shown) is inserted in the keeping case, the inner case 2 should be opened, and then, the cassette tape should be inserted into the opening of the inner case 2, and finally the inner case 2 is closed to the outer case 3.

In accordance with the present invention, the cassette tape keeping cases are connected with each other by means of connecting parts. As shown in FIG. 1 and FIG. 2, the connecting parts have the inserting part 4 at the upper part and the lower part in the rear of the outer case 3. The front of the inserting part 4 (on the left side in drawing) has a little narrow opening and the rear of the inserting part 4 (on the right side of the drawing) has a wide opening. A slanted step(5) is formed between the above two openings. The upper part of the two openings is generally opened and the upper part of the narrow opening has a projection 6.

Meanwhile, a connecting body 7 is inserted into the said inserting part 4 The connecting body 7 is divided into the front clip 8 and the rear clip 9 and the upper surface of the rear clip 9 has a projection 11.

Usually, the connecting body 7 is seated on the inserting part 4 of the inner case 2. That is, the front clip 8 of the connecting body 7 is located at the wide front opening of the inserting part 4 and the rear clip 9 is located at the narrow rear opening of the inserting part 4. The front clip 8 and the rear clip 9 of the connecting body 7 are maintained with divided form in the middle of the slanted step 5 of the inserting part 4, and a projection 11 of the connecting body 7 is projected from the upper opening of the inserting part 4.

When a cassette keeping case is connected to another cassette keeping case, the front clip 8 of the connecting body 7 maintaining the said position should be projected from the wide opening of the inserting part 4, and then, inserted into the front opening of the inserting part 4 of the other cassette keeping case by pushing the projection 11.

FIG. 3 shows such connected condition of the two cassette keeping cases.

Figure 4:
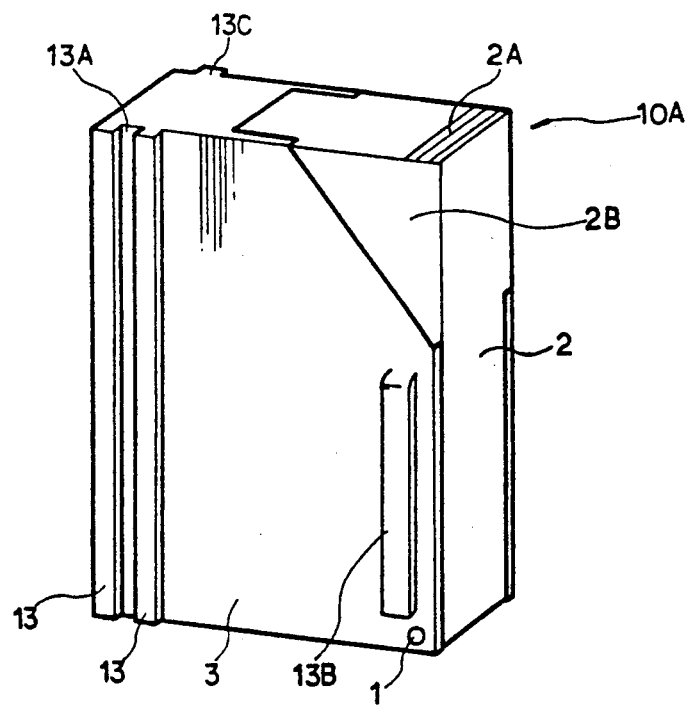
FIG. 4 is a perspective view of a modification of the cassette keeping case in accordance with the present invention.
Figure 5:
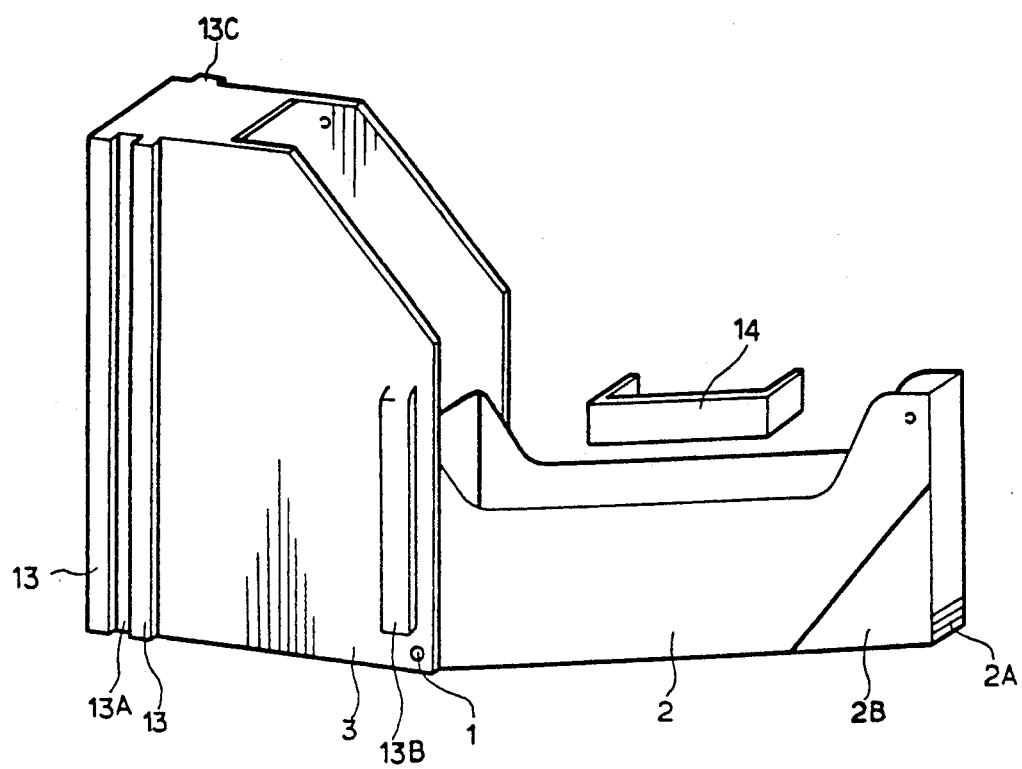
FIG. 5 is a perspective view of the cassette keeping case as opened in FIG. 4.
Figure 6:
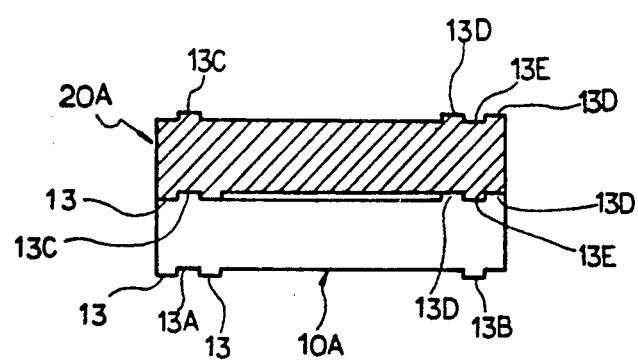
FIG. 6 is a transversely sectioned view of keeping cases of FIG.4 showing the connected condition.
Figure 7:
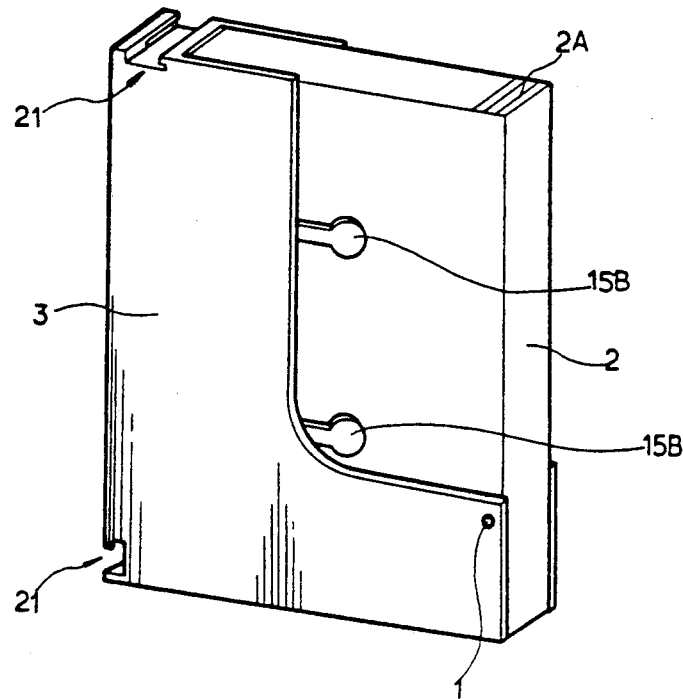
FIG. 7 is the other embodiment of the cassette tape case in accordance with the present invention.

FIG. 4 to FIG. 6 show another embodiment of the cassette keeping case in accordance with the present invention.

As shown in the above embodiment, the inner case 2 can be opened by rotation of the inner case 2 about the pivot 1. The upper portion of the inner case 2 has a grooves 2A. By applying forces on the groove 2A of the inner case 2, opening operation can be easily accomplished. The left and the right sides of the upper portion of the inner case 2 have a projected surface 2B, respectively which prevents the inner case 2 from excessive inserting into the outer case 3.

The pivot 1 is formed at the lower portion in different way from the said embodiments. The left and the right sides of an outer case 3 have a connecting part, respectively, which connects each of the keeping cases.

As shown, the rails 13,13 and a rail groove 13A are longitudinally formed at one side of the rear portion of a outer case 3, and the front portion of the outer case 3 also has a rail 13B. The other side of the outer case 3 has the second rail 13C formed at the opposite position of said rails 13,13 and groove 13A. Another rail 13D,13D and, the rail groove 13E (See the FIG. 6) are formed at the opposite position of the said rail 13B. Thus, when each of the cassette keeping cases 10A,20A is connected, the rail 13C of a keeping case 10A may be inserted into the rail groove 13A of the other keeping case 20A, and the rail 13B of the other keeping case 20A may be inserted into the rail groove 13E of a keeping case 10A.

FIG. 6 illustrates a plurality of keeping cases in a connected condition. Even though this embodiment illustrates the rails and the grooves formed longitudinally, they may also be formed transversely. FIG. 5 illustrates the opened state of the inner case 2. A cassette tape is inserted into the inner case 2 shown in FIG. 5. In this case, clip 14 is locked in the two reel holes of the cassette tape, so that, one may carry it without the loosening of the tape.

FIG. 7 to FIG. 15 are other embodiments of this invention. In those embodiments, the principal operation is such that an inner case 2 is rotated at the center pivot 1 to be open.

However, in this embodiments, a locking member 15 is separately provided at one side of a inner case 2, such that loosening of a cassette tape inserted into the keeping case can be prevented.

Figure 9:
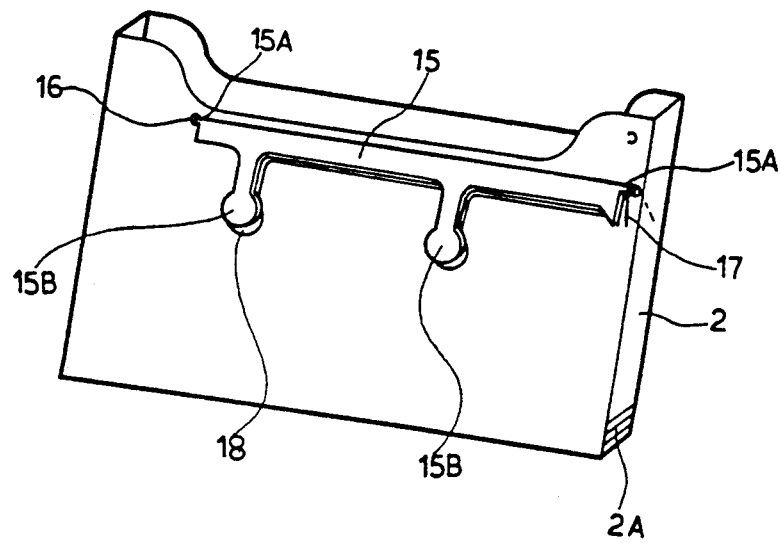
FIG. 9 is a schematic drawing of the inner case of the keeping case shown in FIG. 8.

As shown in FIG. 9, the locking member 15 has a prominence 15A at the end part. The prominence 15A is fixed at the hollow 16 formed at the side wall of a inner case 2. A spring 17 is inserted between the hollow 16 and the prominence 15A, such that the locking member 15 is always urged toward the outside of the inner case 2.

The lower part of the locking member 15 has a locking portion 15 which is inserted into the reel hole of the cassette tape. The outside surface of the inner case 2 has an opening 18 corresponding to the shape of the locking member 15, so that the locking member 15 is movable by the hinge function of the prominences 15A,15A.

Figure 10:
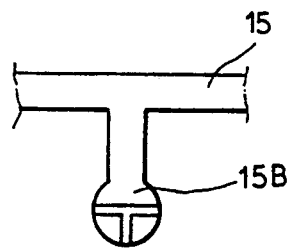
FIG. 10 is a rear view of the locking portion of the keeping case shown in FIG. 9.

FIG. 10 shows the inside of a locking portion 15B of FIG. 9.

The inside part of the locking portion 15B is formed as half cross-section protruding from the inside. When the inner case 2 is closed into the outer case 3 after inserting the cassette tape, the protuberance having a half cross section is depressed and inserted into the reel hole of a cassette tape such that the loosening of the tape can be prevented.

Figure 11:
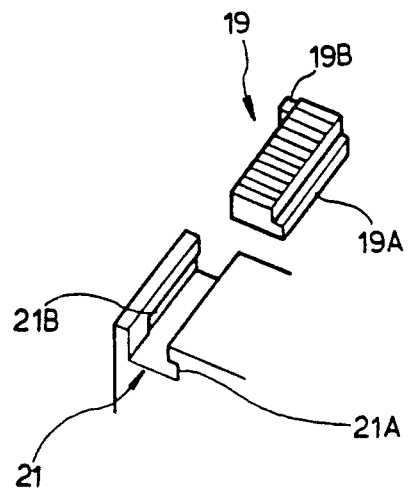
FIG. 11 is an exploded view of the connection part of the keeping case.

FIG. 11 shows a connecting body 19 which is inserted into the upper portion and the lower portion of the outer case 3 and which connects two cassette tape keeping cases with each other.

The connecting body 19 is seated in the connecting portion 21 which has an inner rail 21A and a step 21B. The connecting body has a rail surface 19A inserted in the said inner rail 21A and a prominence 19B provided in rear. Accordingly, when the connecting body 19 is inserted into the said connecting portion 21, the rail surface 19A of a connecting body 19 is slided into the inner rail 21A. In this case, after the connecting body 19 is fully inserted, it is stopped by means of the prominence 19B of a connecting body 19 from the excessive advancing in the step 21B.

Figure 12:
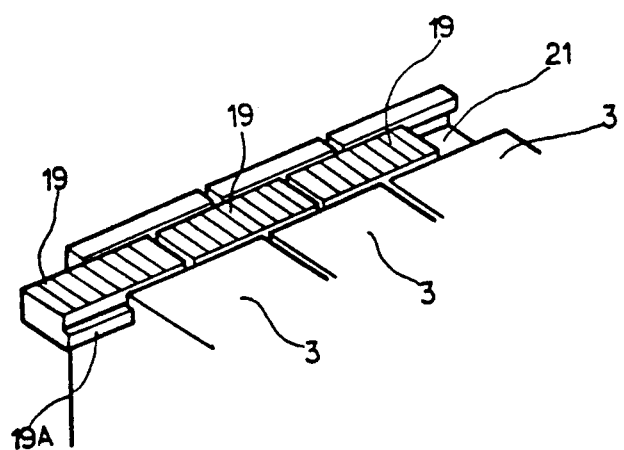
FIG. 12 is a partially connected view of each keeping case.

FIG. 12 shows such connected upper parts of the outer cases 3. The lower part of the outer case 3 is also connected with each other in the same method as explained above. That is, the lower part of the outer case 3 also has a connecting portion 1. However this lower connecting portion 21 is formed vertically at the back of the outer case 3. Thereby, it is possible to connect each keeping case continuously.

Figure 13:
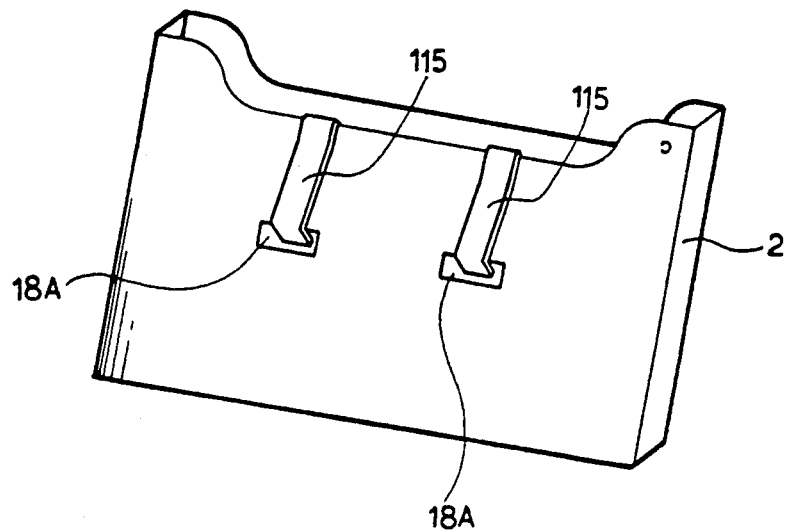
FIG. 13 is another embodiment of a inner case applied to the cassette keeping case.

FIG. 13 shows another embodiment of the said locking member 15. One side of the inner case 2 has two openings 18A. The opening 18A is located at the corresponding position to the reel hole of the inserted cassette tape. A locking member 115 extending from the upper to the lower is attached on the outside of the inner case 2. A predetermined length of the locking member 115 is folded at the upper portion of a inner case 2, and the lower part of the locking member 115 is bended upwardly and finally has a perpendicular part 115A. The perpendicular part 115A is opposite to the opening 18A. That is, the locking member 115 consists of a bendable material like plastic or metallic, so that when pressed, it is resiliently movable.

Figure 8:
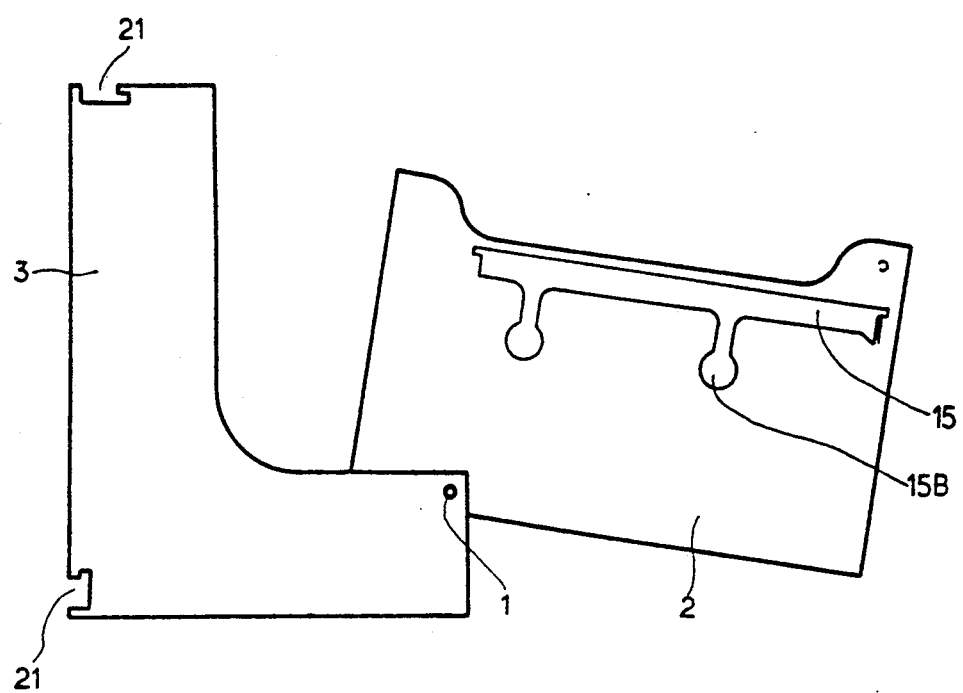
FIG. 8 is a side view of the opened condition of the keeping case in FIG. 7.

Therefore, in this embodiment, the inner case 2 having a locking member 115 is closed into the outer case 3 in FIG. 8, the locking member 115 is depressed to the inside surface of the outer case 3 and the perpendicular part 115A is inserted into the opening 8A and the reel hole of the cassette tape, which is located in the inner case 2. Consequently, when one may move with this cassette tape keeping case without loosening of the tape.

The embodiments of FIG. 7 to FIG. 13 illustrate that a connection of the cassette tape keeping cases includes a connecting body 19 and a connecting portion 21. However, it is apparent that the connecting part may also consist of the rails and rail groove shown in FIG. 4 to FIG. 6.

FIG. 14 to FIG. 17 are another embodiment of this invention.

Figure 14:
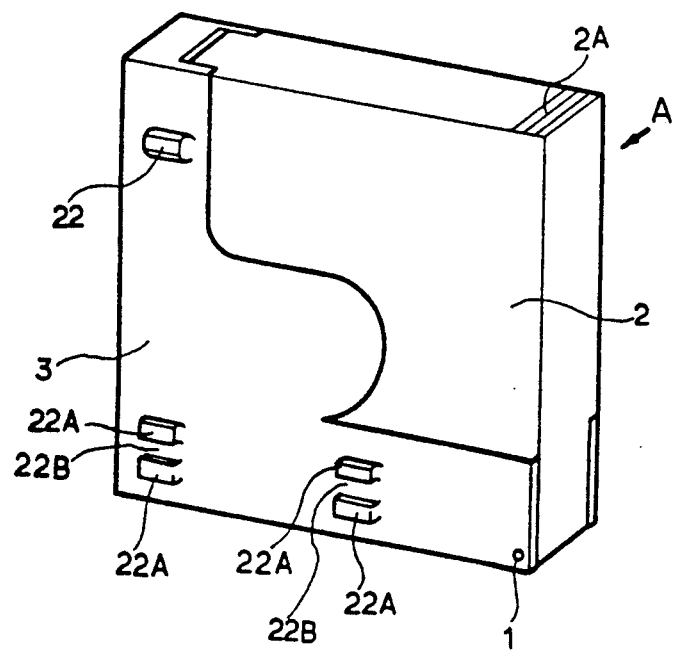
FIG. 14 is a perspective view of a compact disc keeping case in accordance with the present invention.
Figure 15:
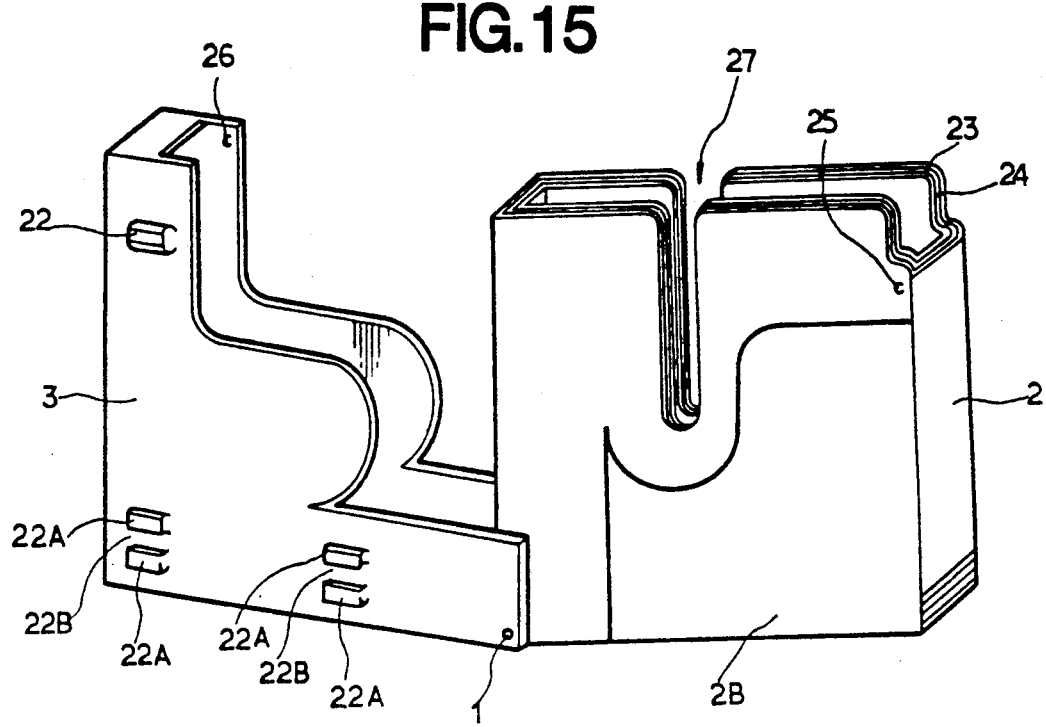
FIG. 15 shows an opened condition of the compact disc keeping case of FIG. 14.

In this embodiment, the principal constitution of this invention is applied to the compact disc keeping case. As shown in FIG. 14, the connecting part for connecting each keeping case is a prominence and two pairs of prominences in each side of the outer case 3. A prominence 22 is located at the upper side of the outer case 3 and two parts of prominences 22A,22A having a dented part formed between a pair of prominences are located at the lower side of the outer case 3. The opposite side of outer case 3 also has a pair of prominences 22C,22C having the second dented part 22D in which the upper prominence 22 of the other keeping case is inserted and two of the third prominences 22E,22E which is inserted between the prominences 22A,22A of the other keeping case. When each keeping case is connected, the prominence 22 of the outside of a keeping case is inserted into the second dented part 22D between the second prominences 22C,22C on the other side of the outer case 3 of the other keeping case, and, in the dented part 22B between a pair of prominences 22A,22A on one side of a keeping case, the third prominence 22E of the other keeping case is inserted.

Figure 16:
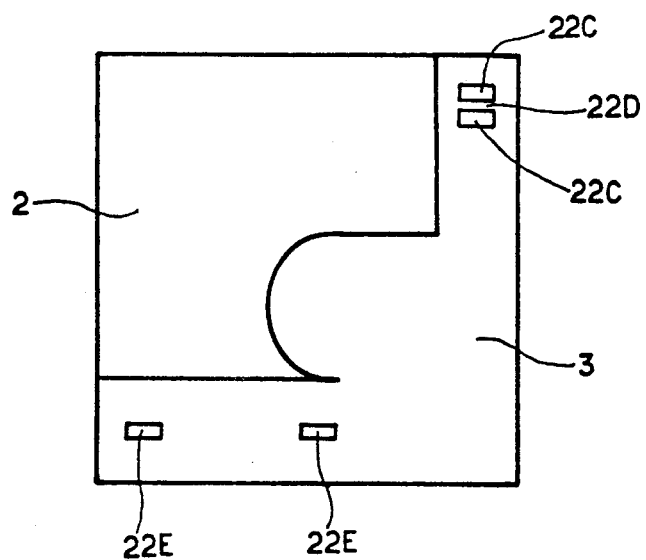
FIG. 16 is a rear view of the keeping case shown in "A" direction of FIG. 14.
Figure 17:
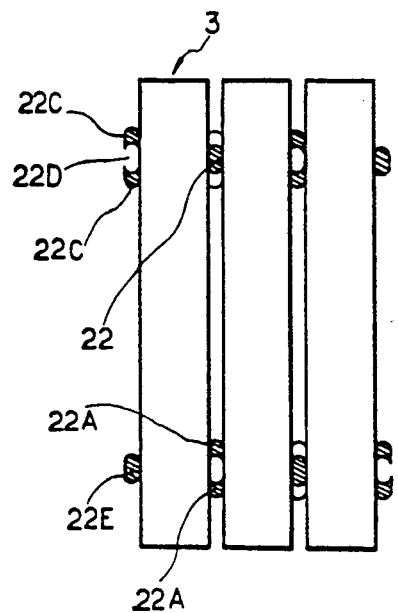
FIG. 17 shows a connected condition of the keeping case in accordance with the present invention.

FIG. 16 shows the other side of the outer case 3, and FIG. 17 shows a connected state of each keeping case viewed in the rear.

In accordance with the present invention, the inner side of the inner case 2 of a compact disc has a scratch protecting layer 23 consisted of paper or wood material and the magnetic insulated layer 24 formed between the inner case 2 and the scratch protecting layer 23 such that the double layer is constituted in the inner case 2. Then, the scratching of a compact disc surface and the defect by the other magnetic surroundings can be prevented to maintain its quality.

Each side of the inner case 2 has a projected surface 2B, so as to be in the same surface level with the outside of the outer case 3. Therefore, when the inner case 2 is closed, each side of the keeping case can keep the same flat surface. This may give a facility to arrange the keeping cases. In the upper portion of a inner case, a concavity 25 is formed, and in the inside of the inner case 2, protrusion 26 of the outer case 3 is fixed in the concavity 25 of the inner case 2 to prevent easy opening. In the middle of the inner case 2, a longitudinal opening 27 is formed. Therefore, in case of inserting the disc, one may insert a finger into the center hole of the compact disc and put a finger into the longitudinal opening 27 and then, lower the compact disc into the inner case 2, so that it can prevent the contamination of the surface of a compact disc by hand.

Figure 19:
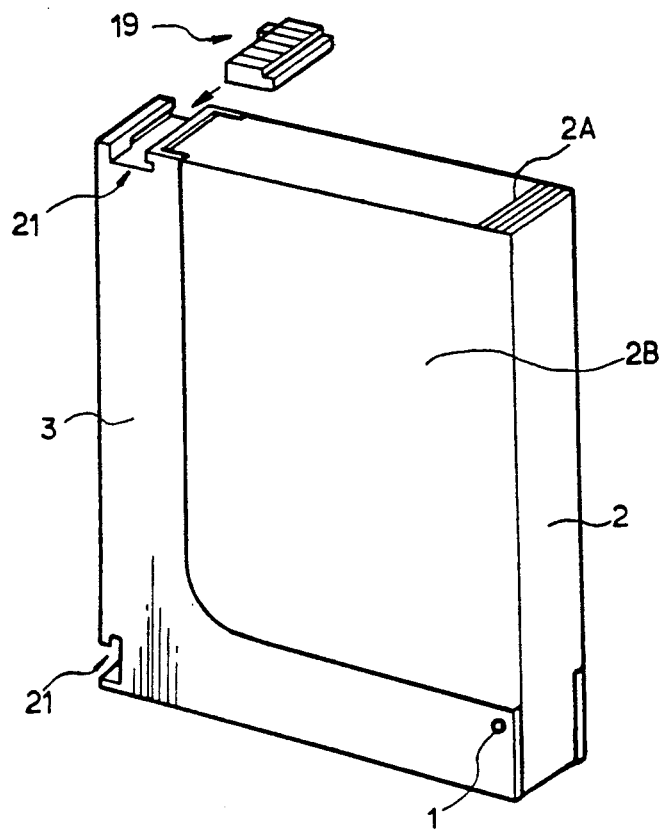
FIG. 19 is a perspective view of a video tape keeping case in accordance with the present invention.

FIG. 19 shows another embodiment of the compact disc keeping case in accordance with the present invention. In the former embodiment, the connecting part of a compact disc is consisted of the prominence and dented parts 22-22E, however, in this embodiment, the connecting part includes a connecting body 19 and a connecting portion 2i which are previously applied to the cassette tape keeping case in FIG. 11. The detailed descriptions about their constitutions and their connections have been already illustrated in the above, so they will be abbreviated.

Figure 18:
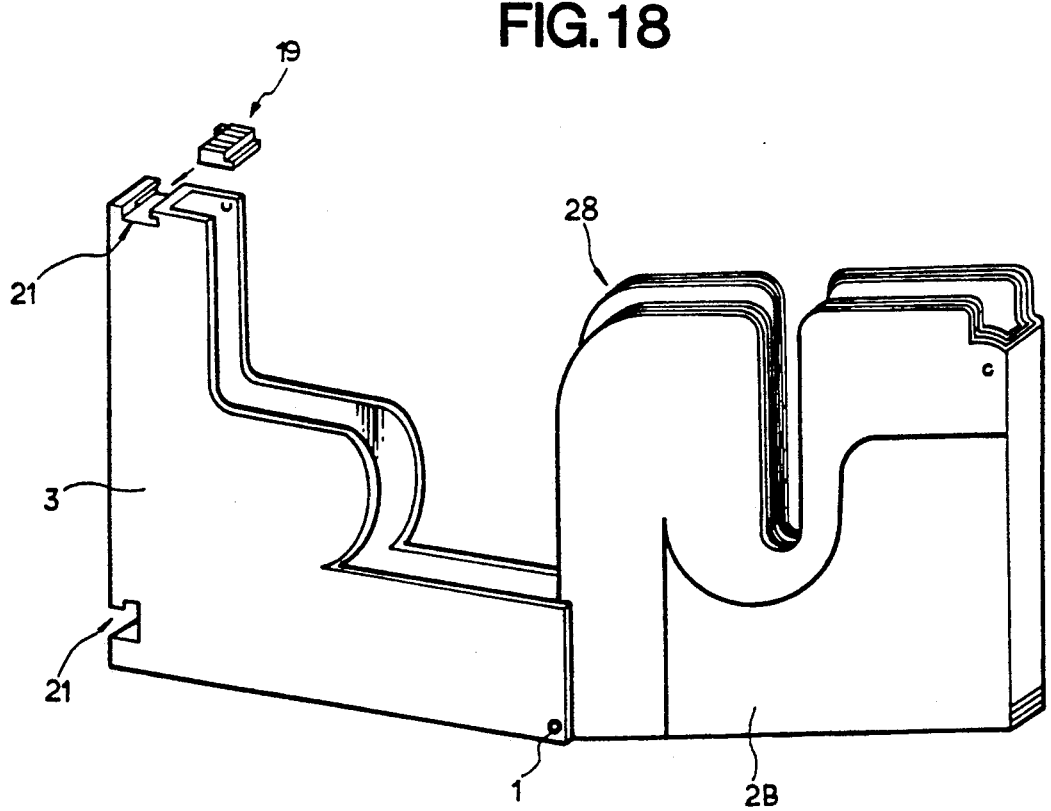
FIG. 18 is another embodiment of a compact disc keeping case in accordance with the present invention.

In this embodiment, the projected surface 2B shown in FIG. 18, can be also omitted. The upper edge of the inner case 2 (on the left of FIG. 18) may have a round 28 different from the embodiment of FIG. 15, so that, when the inner case 2 is closed into the outer case 3, inner case 2 may be smoothly closed without prevention by the outer case 3.

Figure 20:
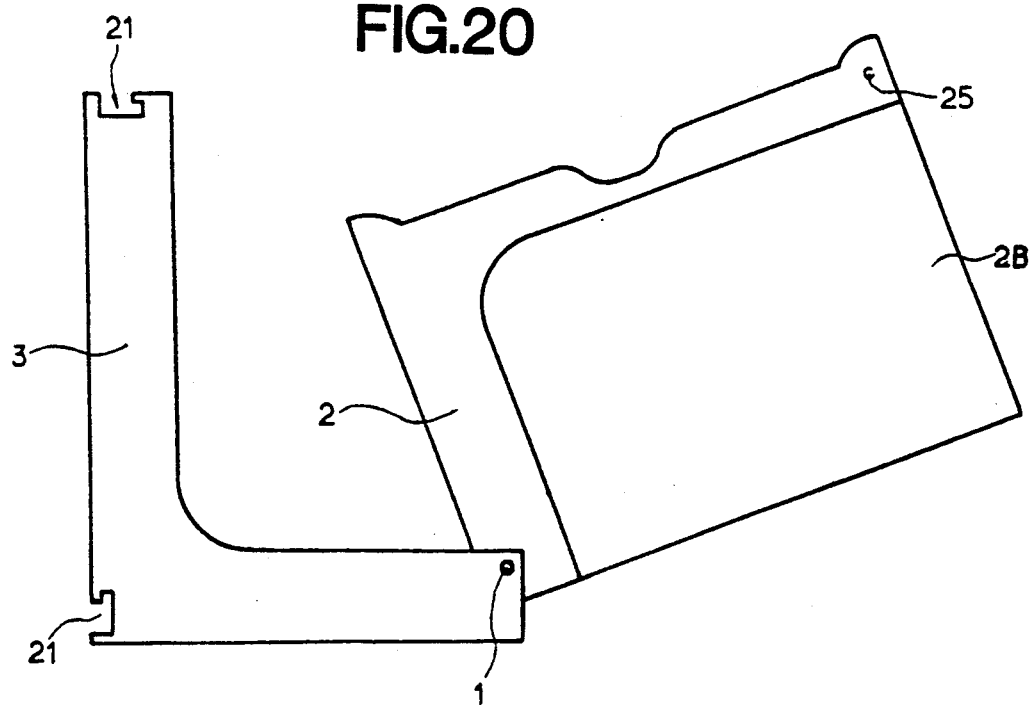
FIG. 20 is a side view of the opened condition of the video tape keeping case shown in FIG. 19.

FIG. 19 and FIG. 20 are another embodiment of this invention, which are applied to a video tape keeping case. In this embodiment, each of the video keeping cases is connected by means of a connecting body 19 and a connection portion 21. The principal construction of this invention is that the inner case 2 is opened by rotation of the center pivot 1. Each upper side of the inner case 2 has a concavity 25 like FIG. 15 and the inner side of the outer case 3 opposing to the concavity 25 like FIG. 15 and the inner side of the outer case 3 opposing to the concavity 25 of a inner case 2 has a protrusion (not shown) such that, when the inner case 2 is closed, it may not be easily opened without applying the external force. The connection part of a video tape keeping case in accordance with the present invention, may be also consisted of the rails and rail groove or the prominence 22 and dented part 22B etc., upwardly or transversely as previously illustrated. The pivot of the keeping case in accordance with the present invention can be located at any vertical position of the outer case 3. Namely, as shown in the above embodiments, the pivot 1 can be located at predetermined position from the lowest part to the middle part of the inner case 2.

It will be noted from the above illustration that the principal constructions of this invention may be applied to a video tape, cassette tape, compact disc etc.; and the constitutions are illustrated as preferable embodiments. As various changes could be made in the above constructions without departing from the scope of the invention, it is intended that all matter contained in the above description or shown in the accompanying drawings shall be interpreted as illustrative and not a limiting sense.

In accordance with the present invention, it is effective that the keeping case is opened at the center pivot by rotation, so that the opening operation is very easily made, and each of keeping case can be connected continuously, so that there are no need of a stand, separately.

What is claimed is:

1. A keeping case for keeping a generally planar article, comprising:
    an outer case having spaced apart parallel first and second side walls and a plurality of end walls connected to and extending between the side walls, the end walls having a plurality of connecting recesses therein extending between the side walls, each said connecting recess including opposed first and second edge walls extending between the side walls, the first edge wall of each said recess having an undercut extending from the first side wall to the second side wall, the second edge wall of each said recess having an undercut terminating intermediate the side walls to define a step in said recess;

an inner case dimensioned to receive the planar article therein and being dimensioned to be at least partly received within the outer case;

pivoting means connecting the inner and outer cases for enabling rotation of the inner case relative to the outer case in the plane of the article in the inner case; and a connecting body for each of said connecting recesses, each said connecting body being substantially planar with opposed top and bottom surfaces, opposed first and second sides and opposed first and second ends, each said connecting body being slidably engaged in one said connecting recess, the first side of each said connecting body defining a rail slidably engaged in the undercut of the first edge wall of the respective connecting recess, the second side of each said connecting body defining a prominance adjacent the first end and engaged in the under cut of the second edge wall of the respective connecting recess, each said connecting body defining a length between the opposed first and second ends thereof approximately equal to the spacing between the first and second side walls of the outer case, each said connecting body being disposed in the respective connecting recess such that in a first portion the ends of the connecting body are aligned with the respective side walls, and such that in a second position the first end of the connecting body is disposed intermediate the first and second side walls of the outer case with the prominence engaging the step, and such that the second end thereof projects beyond the second side wall of the outer case, the top surface of each said connecting body having ribs extending between the first and second sides thereof for facilitating slidable advancement of each said connecting body in the respective connecting recess between the first and second positions, each said connecting body enabling connection of the keeping case to another substantially identical keeping case, such that the respective planar articles therein are disposed in substantially parallel side-by-side relationship to one another.

2. A keeping case as set forth in claim 1 wherein, the inner case comprises a locking member movable fixed to the inner case by means of a spring for urging the locking member away from the inner case, and the inner case has an opening opposed to the locking member to enable the locking member to pass through the inner case and engage the planar article therein.

* * * * *